Patented Nov. 10, 1931

1,831,611

UNITED STATES PATENT OFFICE

BENJAMIN SEGALL, OF NEW YORK, N. Y.

INK REMOVING CREAM

No Drawing. Application filed March 12, 1929. Serial No. 346,499.

This invention relates generally to cleaning liquids and has more particular reference to a novel ink remover.

The invention has for an object the provision of a preparation of the class mentioned that is dependable in use and efficient in action, and which can be manufactured and sold at a reasonable cost.

For further comprehension of the invention and of the objects and advantages thereof, reference will be had to the following description and to the appended claims in which the various novel features of the invention are more particularly set forth.

The invention consists in the use of alcohol, hydrogen peroxide, ammonia and soap, and to enable others to make use of my invention I give the following as one of the most approved formulas for compounding and manufacturing the same.

Place in any suitable vessel, 50 grams of peroxide, 50 grams of ammonia, 15 grams of alcohol, and 35 grams of soap. The soap may be any kind and preferably it should be of the liquid type.

Thoroughly mix these ingredients and then allow them to remain quiet for about five minutes. Then cook for about twenty minutes on a low fire so as not to drive off the alcohol and the ammonia, but to cause the ingredients to become slightly cooked. Next allow same to cool and then shake or beat until a cream forms. The color of this cream will be white.

The soap in the preparation serves to form the cream when the compound is thoroughly agitated by reason of its foaming. Further it holds the various other ingredients together and acts in the preparation to clean material to which the preparation is applied. The ammonia acts to eradicate ink stains and the hydrogen peroxide weakens the strength of the ammonia to produce an efficient action of the preparation. The alcohol tends to maintain the paste form in which the preparation is finally left.

The ink remover should be packed in jars or the like and in application one need only remove some of the cream with the finger and thoroughly rub the same upon the clothing which has been soiled by ink blots. After a thorough rubbing in this fashion the portion to which the ink remover has been applied should be washed.

While I have described my invention with some degree of particularity I realize that in practice various alterations therein may be made. I therefore reserve the right and privilege of changing the forming of the details of construction or otherwise altering the arrangement of the correlated parts without departing from the spirit or the scope of the appended claims.

Having thus described my invention, what I claim as new, and desire to secure by United States Letters Patent is:—

1. A method for preparing an ink remover cream, consisting of mixing alcohol, peroxide, ammonia and soap together, permitting the mixture to remain undisturbed for five minutes, then heating the same for twenty minutes to a temperature below the point of substantial volatilization, next cooling and then shaking till a cream forms.

2. A method for preparing an ink remover cream, consisting of mixing alcohol, peroxide, ammonia and soap together, permitting the mixture to remain undisturbed for five minutes, then heating the same for twenty minutes to a temperature below the point of substantial volatilization, next cooling and then shaking till a cream forms, the ingredients being used in the proportion of 15:50:50:35, respectively.

3. A method for preparing an ink remover cream, consisting of mixing alcohol, peroxide, ammonia and soap together, permitting the mixture to remain undisturbed for five minutes, then heating the same for twenty minutes to a temperature below the point of substantial volatilization, next cooling and then shaking till a cream forms, the ingredients being used in the proportion of 15:50:50:35, respectively, the soap being used in liquid form.

In testimony whereof I have affixed my signature.

BENJAMIN SEGALL.